Patented May 7, 1940

2,199,987

UNITED STATES PATENT OFFICE 2,199,987

AZO COMPOUNDS AND PROCESS FOR DYEING THEREWITH

Joseph B. Dickey and James G. McNally, Rochester, N. Y., assignors to Eastman Kodak Company, Rochester, N. Y., a corporation of New Jersey No Drawing. Application February 7, 1938,
Serial No. 189,170

9 Claims. (Cl. 260—152)

This invention relates to azo dye compounds having a tetrahydrofuryl group attached to an amino group which is a nuclear substituent of a benzene or naphthalene nucleus and their application to the art of dyeing. More particularly, the invention includes the azo dye compounds, the process for their preparation, the application of the nuclear non-sulfonated azo dye compounds for the dyeing of organic derivatives of cellulose and materials made of or containing an organic derivative of cellulose dyed with said nuclear non-sulfonated azo compounds.

Organic derivatives of cellulose are characterized by an indifferent affinity for the usual cotton or wool dyes, especially the ordinary water-soluble dyes, and their dyeing constitutes a special problem. Typical organic derivatives of cellulose include the hydrolyzed as well as the unhydrolyzed cellulose organic acid esters, such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose.

The azo dye compounds of our invention have the general formula:

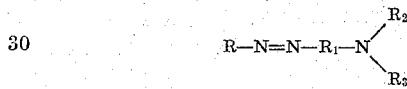

wherein R represents an aromatic nucleus, $R_1$ represents a benzene or naphthalene nucleus, $R_2$ represents hydrogen, an alkyl group, a cycloalkyl group, an aryl group, a tetrahydrofuryl group or a tetrahydrofuryl group joined to the nitrogen atom through an aliphatic linkage and $R_3$ represents a tetrahydrofuryl group or a tetrahydrofuryl group joined to the nitrogen atom through an aliphatic linkage. Advantageously, R and $R_1$ are benzene nuclei.

The compounds of our invention can be prepared by diazotizing a suitable aromatic amine and coupling the diazonium compound formed in an acid medium with a coupling compound having the general formula:

wherein $R_1$, $R_2$ and $R_3$ have the meaning previously assigned to them.

It will be understood that the nuclei designated R and $R_1$ can contain substituents. $R_1$ may be substituted, for example, with a halogen atom, such as chlorine or bromine, an alkyl group, such as methyl, ethyl, propyl, butyl, hydroxyethyl, hydroxypropyl, hydroxybutyl, —$CH_2CH_2SO_3H$, or —$CH_2CH_2CH_2SO_3H$, an alkoxy group, such as methoxy, ethoxy or propoxy, a hydroxy group, a nitro group, an aryl group such as phenyl, chlorophenyl, nitrophenyl or alkoxyphenyl and an aryloxy group such as a phenoxy or a chlorophenoxy group. The aromatic nucleus designated R representing the residue of the diazo component may be substituted, for example, with a halogen atom, an alkyl group, an alkoxy group, a hydroxy group, or a nitro group as more fully appears hereinafter. When $R_2$ is alkyl it may be an alkyl group as defined in connection with $R_1$. Similarly, when $R_2$ is aryl, it may be an aryl nucleus such as mentioned in connection with $R_1$ and when it is cycloalkyl, it may be cyclohexyl, for example.

Further, it will be understood that the expression "a tetrahydrofuryl group" appearing herein and in the claims includes not only the tetrahydrofuryl group itself but also tetrahydrofuryl derivatives such as 5-methyl-tetrahydrofuryl, 5-ethyl-tetrahydrofuryl, 5-$\beta$-hydroxyethyl-tetrahydrofuryl and 5-$\gamma$-hydroxypropyl-tetrahydrofuryl.

The nuclear non-sulfonated azo compounds of our invention, as indicated generally above, constitute valuable dyes which may be employed for the dyeing of materials made of or containing organic derivatives of cellulose. Dyeings produced employing said non-sulfonated azo compounds are, in general, of good fastness to light and washing and range in shade from yellow to purple. Nuclear sulfonated compounds having the general formula given in connection with the azo dye compounds of our invention may be prepared in known fashion and possess application for dyeing of textile materials such as wool, cotton and silk.

The tetrahydrofuryl group may be directly attached to the amino group which is directly joined to the benzene or naphthalene nucleus designated $R_1$ through the carbon atom in the 2-position of the tetrahydrofuryl group or it may be joined thereto through an aliphatic linkage. Where the tetrahydrofuryl group is joined to the amino group through an aliphatic linkage the aliphatic linkage normally will contain not more than 4 carbon atoms, although it may contain more. This aliphatic linkage may be, for example, a straight chain hydrocarbon linkage such as —CH$_2$—, —CH$_2$CH$_2$—, —CH$_2$CH$_2$CH$_2$— or —CH$_2$CH$_2$CH$_2$CH$_2$—, for example.

The following examples illustrate the method of preparation of the azo compounds of our invention. Unless otherwise indicated, quantities are expressed in parts by weight.

*Example 1*

12.8 grams of o-chloroaniline are dissolved in 150 cc. of water to which has been added 25 cc. of 36% hydrochloric acid. The resulting solution is cooled to a temperature of 0–5° C. by the addition of ice, for example, and the amine is diazotized while maintaining a temperature of 0–5° C. by adding, with stirring, a water solution of 6.9 grams of sodium nitrite.

19.1 grams of tetrahydrofurfuryl-m-toluidine are dissolved in cold dilute hydrochloric acid and the diazo solution prepared as described above is added with stirring. The mixture is permitted to stand for 30 minutes following the addition of the diazo solution after which it is slowly made neutral to Congo red paper by the addition of sodium acetate. The dye compound which precipitates is recovered by filtration, washed with water, and dried. It has the formula:

[Structural formula]

and colors cellulose acetate silk yellow from a water suspension.

*Example 2*

13.5 grams of p-aminoacetophenone are added to 150 cc. of water containing 25 cc. of 36% hydrochloric acid. The resulting solution is cooled to a temperature of 0–5° C. following which the amine is diazotized while maintaining this temperature by adding, with stirring, a water solution of 6.9 grams of sodium nitrite.

22.1 grams of β-tetrahydrofurylethyl-m-anisidine are dissolved in dilute hydrochloric acid and the resulting solution is cooled to a temperature approximating 0–10° C. by the addition of ice. The diazo solution prepared as described above is then slowly added, with stirring. The mixture is permitted to stand for about 30 minutes after complete addition of the diazo solution following which it is slowly made neutral to Congo red paper by the addition of sodium acetate. The dye compound which is precipitated is recovered by filtration, washed with water, and dried. The dye compound formed has the formula:

[Structural formula]

and colors cellulose acetate silk an orange shade of good light fastness from a water suspension.

*Example 3*

13.8 grams of p-nitroaniline are added to 150 cc. of water to which has been added 40 cc. of 36% hydrochloric acid. The mixture is cooled to a temperature of 10–20° C. and diazotized at this temperature by adding, with stirring, a water solution of 6.9 grams of sodium nitrite.

17.7 grams of tetrahydrofurfurylaniline are dissolved in cold dilute hydrochloric acid and coupled with the diazonium compound prepared as described above in accordance with the method set forth in Example 1. The dye compound formed has the formula:

[Structural formula]

and colors cellulose acetate silk red from an aqueous suspension.

*Example 4*

17.3 grams of p-nitro-o-chloroaniline are diazotized as described in Example 3 and coupled with 25.4 grams of γ-(5-methyltetrahydrofurylpropyl)-m-chloroaniline. The coupling may be carried out as described in Examples 1 and 2. The dye compound formed has the formula:

[Structural formula]

and colors cellulose acetate silk a red shade from an aqueous suspension.

*Example 5*

13.5 grams of m-aminobenzamide are diazotized as described in Example 1 and coupled in dilute hydrochloric acid with 20.5 grams of tetrahydrofurfuryl-2,5-dimethylaniline. The dye compound formed has the formula:

[Structural formula]

and colors cellulose acetate silk a yellow color from an aqueous suspension.

*Example 6*

15.4 grams of p-nitro-o-hydroxyaniline are diazotized as described in Example 3 and the diazonium compound formed is coupled in an acetic acid solution with 22.1 grams of tetrahydrofurfurylcresidine. The coupling reaction may be carried out in accordance with the method described in Examples 1 and 2. The dye compound formed has the formula:

[Structural formula]

and colors cellulose silk a red color from an aqueous suspension.

*Example 7*

18 grams of 6-methoxy-2-aminobenzothiazole are dissolved in a warm mixture of 55 cc. of water and 16 cc. of formic acid and following solution the mixture is cooled and added to a cold mixture of 50 cc. of water and 110 grams of concentrated sulfuric acid. (Specific gravity 1.83.) The amine is then diazotized at a temperature of —5° C. by the addition, with stirring, of a water solution of 6.9 grams of sodium nitrite.

27.1 grams of tetrahydrofurfuryl-2-β-hydroxyethoxy-5-chloroaniline are dissolved in cold dilute hydrochloric acid and coupled with the diazonium compound formed as described above. The coupling may be carried out as described in Example 1. The dye compound formed has the formula:

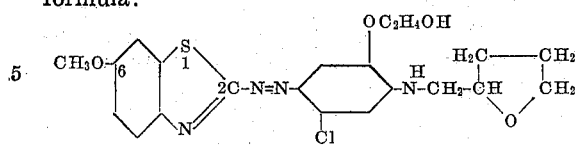

and colors cellulose acetate a red color from an aqueous suspension.

*Example 8*

(A) 7.6 grams of sodium nitrite are dissolved in 53 cc. of sulfuric acid (sp. gr. 1.84) warmed to 70° C. and then cooled to 10–15° C.

(B) 18.3 grams of 2,4-dinitroaniline are dissolved in 220 cc. of hot concentrated acetic acid and then rapidly cooled to room temperature.

The mixture formed in (B) is then added to the solution formed in (A), with stirring, while maintaining a temperature of 10–15° C. This addition requires about 30 minutes.

Following the addition of mixture (B) to solution (A), the resulting mixture is stirred for one hour and then one gram of urea is added.

23.7 grams of 3,5-dimethoxytetrahydrofurylaniline are dissolved in dilute sulfonic acid. The resulting solution is cooled to a temperature approximating 0–10° C. and coupled as described in Example 1 with the diazo solution formed as described above. The azo dye compound resulting has the formula:

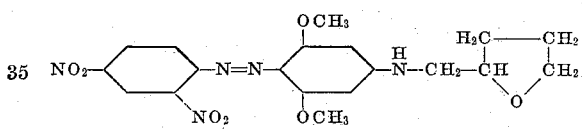

and dyes celulose acetate silk a red shade from an aqueous suspension.

*Example 9*

22.7 grams of tetrahydrofurfuryl-α-naphthylamine are dissolved in cold dilute hydrochloric acid and coupled with one equivalent of the diazo solution prepared as described in Example 8. The dye compound formed has the formula:

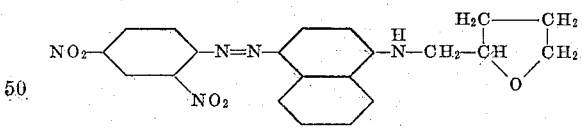

and dyes cellulose acetate a purple color.

*Example 10*

26.2 grams of 2,4-dinitro-6-bromoaniline are diazotized in accordance with the method described in Example 8 and the diazonium compound formed is coupled in a dilute hydrochloric acid solution with 22.7 grams of tetrahydrofuryl-α-naphthylamine. The compound formed has the formula:

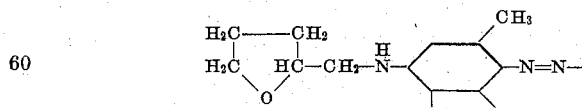

and dyes cellulose acetate silk a blue color.

*Example 11*

26.2 grams of 2,4-dinitro-6-bromoaniline are diazotized in accordance with the method set forth in Example 8 and the diazonium compound formed is coupled in a cold dilute hydrochloric acid solution with 22.1 grams of tetrahydrofurfurylcresidine. The dye compound formed has the formula:

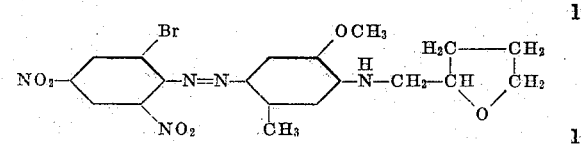

and dyes cellulose acetate silk a wine color.

*Example 12*

33.2 grams of

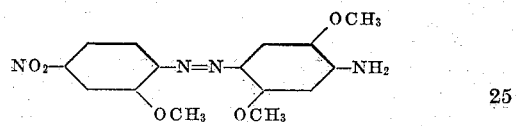

are added to 200 cc. of water to which has been added 40 cc. of 36% hydrochloric acid and the resulting mixture is diazotized at a temperature of 20° C. by the addition, with stirring, of a water solution of 6.9 grams of sodium nitrite. 25.8 grams of 1-tetrahydrofurfuryl-3-methoxy-α-naphthylamine are dissolved in cold dilute hydrochloric acid and coupled with the diazonium compound prepared as described above. The dye compound formed has the formula:

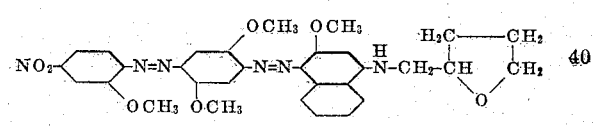

*Example 13*

24.4 grams of dianisidine are dissolved in a hot aqueous hydrochloric acid solution and following solution, the mixture is cooled by pouring onto ice, for example. The amine is then diazotized in the usual manner by the addition of a water solution of 13.8 grams of sodium nitrite.

47 grams of 3,5-dimethyl-6-methoxytetrahydrofurfurylaniline are dissolved in a cold dilute hydrochloric acid solution and coupled with the diazonium compound formed as described above. The dye compound has the formula:

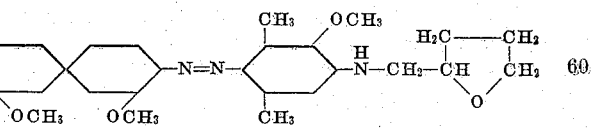

and dyes cellulose acetate an orange color.

*Example 14*

16 grams of 1-amino-8-naphthol-2,4-disulfonic acid are dissolved in 200 cc. of water containing 11 grams of sodium carbonate. The resulting solution is cooled to 0° C. and the amine is diazotized in the usual manner by the addition of a water solution of 7 grams of sodium nitrite. The solution resulting is added to a solution of 50 grams of HCl in 50 cc. of water.

41.7 grams of

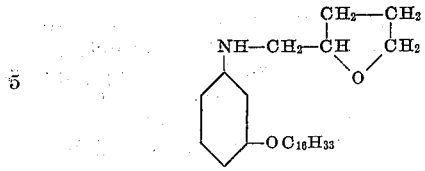

are dissolved in cold dilute hydrochloric acid and coupled with the diazonium compound formed as described above. Coupling may be carried out as described in Example 1. The dye compound formed is precipitated from its solution by the addition of sodium chloride, recovered by filtration, washed with water and dried. It has the formula:

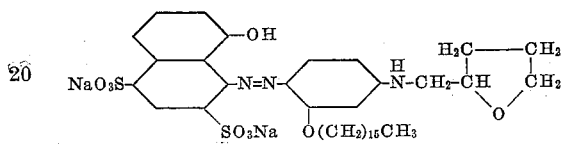

This dye compound is not suitable for the dyeing of cellulose acetate silk but may be employed for the dyeing of other textile materials such as wool.

An equivalent molecular weight of p-nitroaniline-o-sulfonic acid may be substituted for the 1-amino-8-naphthol-2,4-disulfonic acid of the example, being similarly diazotized, to obtain a dye compound capable of dyeing textile materials such as wool and cotton.

It will be understood, of course, that these diazo components may be coupled with the tetrahydrofuryl coupling components disclosed herein to obtain compounds likewise of value for the dyeing of wool, cotton and silk.

*Example 15*

12.8 grams of o-chloroaniline are diazotized in the usual manner and coupled in a cold dilute hydrochloric acid solution with 26.1 grams of ditetrahydrofurfurylaniline. The coupling reaction and recovery of the compound may be carried out as described in Example 1. The dye compound formed has the formula:

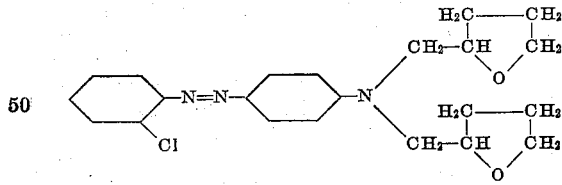

and dyes cellulose acetate silk yellow.

*Example 16*

13.5 grams of p-aminoacetophenone are diazotized as described in Example 2 and the diazonium compound formed is coupled in a cold dilute hydrochloric acid solution with 21.9 grams of

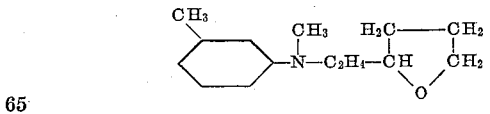

The coupling may be carried out as described in Example 1. The dye compound formed has the formula:

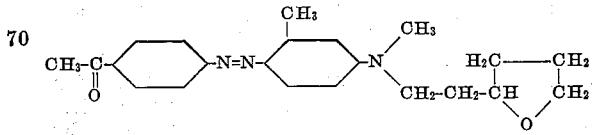

and dyes cellulose acetate silk an orange shade.

*Example 17*

13.8 grams of p-nitroaniline are diazotized as described in Example 3 and the diazonium compound formed is coupled with 36.5 grams of

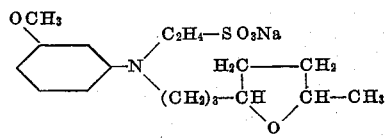

The coupling and recovery of the dye compound may be carried out as described in Example 1. The dye compound formed has the formula:

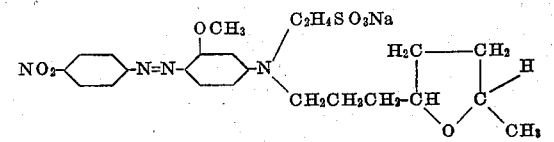

and dyes cellulose acetate silk red from an aqueous suspension.

*Example 18*

17.3 grams of p-nitro-o-chloroaniline are diazotized as described in Example 4 and coupled with 22.1 grams of β-hydroxyethyltetrahydrofurfurylaniline. The coupling may be carried out as described in Example 1. The dye compound has the formula:

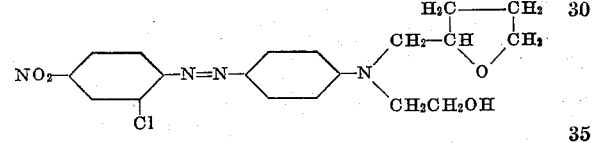

and dyes cellulose acetate silk a rubine shade from an aqueous suspension.

*Example 19*

13.5 grams of m-aminobenzamide are diazotized as described in Example 1 and coupled with 26.5 grams of γ-hydroxypropyltetrahydrofurfuryl-m-anisidine. The coupling and recovery of the dye compound may be carried out as described in Example 1. The dye compound formed has the formula:

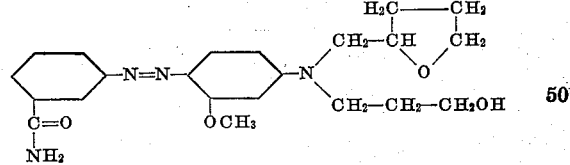

and dyes cellulose acetate silk a yellow color from an aqueous suspension.

β - hydroxypropyltetrahydrofurfuryl - m - anisidine may be substituted for the coupling component of the example to obtain a dye compound which dyes cellulose acetate silk a yellow color from an aqueous suspension.

*Example 20*

15.4 grams of p-nitro-o-hydroxyaniline are diazotized as described in Example 6 and coupled with 29.5 grams of tetrahydrofurfurylglycerylcresidine. Coupling and recovery of the dye compound may be carried out as described in Example 1. The dye compound formed has the formula:

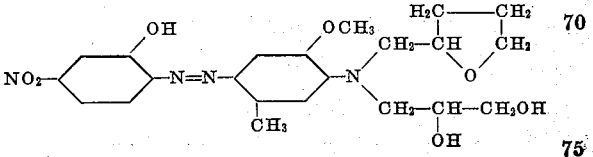

and dyes cellulose acetate silk a red color from an aqueous suspension.

Example 21

18 grams of 6-methoxy-2-aminobenzothiazole are diazotized as described in Example 7 and coupled with 29.6 grams of tetrahydrofurfuryl-allyl-m-bromoaniline. The dye compound having the formula:

$$CH_3O-\underset{6}{\underset{|}{\bigcirc}}\underset{N}{\overset{S}{\underset{1}{\bigcirc}}}C-N=N-\underset{Br}{\bigcirc}-N\underset{CH=CH-CH_3}{\overset{CH_2-CH}{\underset{O}{\bigvee}}\overset{H_2C-CH_2}{\underset{CH_2}{\bigvee}}}$$

is obtained. This compound dyes cellulose acetate silk a red color.

Example 22

18.3 grams of 2,4-dinitroaniline are diazotized as described in Example 8 and the diazonium compound is coupled with 28.1 grams of β-hydroxyethyltetrahydrofurfuryl-2,5-dimethoxyaniline. The coupling may be carried out in cold dilute sulfuric acid. The compound obtained dyes cellulose acetate silk a violet color from an aqueous suspension.

Example 23

27.1 grams of β-hydroxyethyltetrahydrofurfuryl-α-naphthylamine are coupled with one equivalent of the diazonium compound prepared in Example 22. The dye compound obtained dyes cellulose acetate silk a purple color from an aqueous suspension.

Example 24

26.2 grams of 2,4-dinitro-6-bromoaniline are diazotized in accordance with the method described in Example 8 and the diazonium compound formed is coupled with 34.1 grams of β-methoxyditetrahydrofurfuryl-α-naphthylamine. The dye compound formed has the formula:

$$NO_2-\underset{NO_2}{\underset{|}{\overset{Br}{\bigcirc}}}-N=N-\underset{\underset{CH_2-CH}{\underset{O}{\bigvee}}\overset{H_2C-CH_2}{CH_2}}{\overset{OCH_3}{\bigcirc}}-N\underset{CH_2-CH}{\overset{CH_2-CH}{\underset{O}{\bigvee}}\overset{H_2C-CH_2}{CH_2}}$$

and dyes cellulose acetate silk a blue color from an aqueous suspension.

Example 25

26.2 grams of 2,4-dinitro-6-bromoaniline are diazotized in accordance with the method described in Example 8 and the diazonium compound formed is coupled with 29.3 grams of 3,5-dimethyl-6-methoxy-γ-hydroxypropyltetrahydrofurfurylaniline. The dye compound has the formula:

$$NO_2-\underset{NO_2}{\underset{|}{\overset{Br}{\bigcirc}}}-N=N-\underset{CH_3}{\overset{CH_3\ OCH_3}{\bigcirc}}-N\underset{CH_2CH_2CH_2OH}{\overset{CH_2-CH}{\underset{O}{\bigvee}}\overset{H_2C-CH_2}{CH_2}}$$

and dyes cellulose acetate silk a purple color.

Example 26

33.2 grams of $$NO_2-\underset{OCH_3}{\overset{OCH_3}{\bigcirc}}-N=N-\underset{OCH_3}{\overset{OCH_3}{\bigcirc}}-NH_2$$

are diazotized as described in Example 12. The diazonium compound formed is coupled with 28.5 grams of γ-hydroxypropyltetrahydrofurfuryl-α-naphthylamine. The dye compound obtained dyes cellulose acetate silk a wine color.

Example 27

24.4 grams of dianisidine are diazotized as described in Example 13 and the diazonium compound formed is coupled with 23.7 grams of 2-methoxy-5-chloroethyltetrahydrofurfurylaniline. The dye compound obtained dyes cellulose acetate an orange color.

Example 28

16 grams of 1-amino-8-naphthol-2,4-disulfonic acid are diazotized as described in Example 14 and coupled with 44.5 grams of $$\underset{\bigcirc}{\underset{|}{\overset{C_2H_5}{N}}}\underset{-OC_{16}H_{33}}{\underset{-CH_2-CH}{\overset{H_2C-CH_2}{\underset{O}{\bigvee}}\overset{CH_2}{CH_2}}}$$

The compound obtained is not suitable for the dyeing of cellulose acetate silk but may be employed to dye textile materials such as wool and cotton.

p-Nitroaniline-o-sulfonic acid may be diazotized in a manner similar to that described for 1-amino-8-naphthol-2,4-disulfonic acid and coupled with the coupling component of the example to obtain a compound suitable for the dyeing of wool.

Example 29

13.8 grams of p-nitroaniline are diazotized as described in Example 3 and the diazonium compound formed is coupled with 20.7 grams of $$\underset{C_2H_4-OH}{\underset{|}{\overset{\bigcirc}{N}}}\underset{-N}{\overset{H_2C-CH_2}{\underset{CH}{\bigvee}}\overset{CH_2}{\underset{O}{\bigvee}}}$$

The dye compound formed has the formula:

$$NO_2-\bigcirc-N=N-\bigcirc-N\underset{C_2H_4-OH}{\overset{H_2C-CH_2}{\underset{CH}{\bigvee}}\overset{CH_2}{\underset{O}{\bigvee}}}$$

and dyes cellulose acetate silk a red color from an aqueous suspension.

If 16.3 grams of $$\bigcirc-N\underset{H}{\overset{H_2C-CH_2}{\underset{CH}{\bigvee}}\overset{CH_2}{\underset{O}{\bigvee}}}$$

are substituted for the coupling component given above, a dye compound having the formula:

$$NO_2-\bigcirc-N=N-\bigcirc-N\underset{H}{\overset{H_2C-CH_2}{\underset{CH}{\bigvee}}\overset{CH_2}{\underset{O}{\bigvee}}}$$

is obtained. This compound dyes cellulose acetate silk an orange red color.

The following tabulation further illustrates the compounds included within the scope of our invention together with the color they produce on cellulose acetate silk. The compounds indicated below may be prepared by diazotizing the amines listed under the heading "Amine" and coupling with the compound specified in the column entitled "Coupling components." The diazotization and coupling reactions may, for example, be carried out following the general procedure in Examples 1 to 29 inclusive.

| Amine | Coupling components | Color on cellulose acet. silk |
|---|---|---|
| Aniline | (1) Tetrahydrofurfurylaniline | Yellow. |
| Do | (2) Tetrahydrofurfuryl-m-(F,Cl,Br,I)aniline | Do. |
| Do | (3) Tetrahydrofurfuryl-m-methoxyaniline | Do. |
| Do | (4) Tetrahydrofurfuryl-m-ethoxyaniline | Do. |
| Do | (5) Tetrahydrofurfuryl-m-methylaniline | Do. |
| Do | (6) Tetrahydrofurfuryl-m-ethylaniline | Do. |
| Do | (7) Tetrahydrofurfurylcresidine | Do. |
| Do | (8) Tetrahydrofurfuryl-2-methoxy-5-(Cl,Br)aniline | Do. |
| Do | (9) Tetrahydrofurfuryl-2,5-dialkyl(methyl, ethyl, propyl)aniline. | Do. |
| Do | (10) Tetrahydrofurfuryl-2,5-dialkoxy (methoxy, ethoxy) aniline. | Do. |
| o,m,p-(F,Cl,Br,I)aniline | 1-10 | Do. |
| 2,4-dichloroaniline | 1-10 | Orange yellow. |
| 2,4-dibromoaniline | 1-10 | Do. |
| 2,5-dichloroaniline | 1-10 | Do. |
| 2,5-dibromoaniline | 1-10 | Do. |
| 2-methoxy-5-chloroaniline | 1-10 | Do. |
| 2-ethoxy-5-bromoaniline | 1-10 | Do. |
| 2-methyl-4-chloroaniline | 1-10 | Yellow. |
| 2-ethyl-4-bromoaniline | 1-10 | Do. |
| 4-methyl-2-bromoaniline | 1-10 | Do. |
| 4-ethyl-2-chloroaniline | 1-10 | Do. |
| Cresidine | 1-10 | Do. |
| p-Aminoacetophenone | 1-10 | Orange. |
| m-Nitroaniline | 1-10 | Yellow. |
| o-Nitroaniline | 1-10 | Orange red. |
| p-Nitroaniline | 1-10 | Red. |
| p-Nitro-o-methylaniline | 1-10 | Do. |
| p-Nitro-o-ethylaniline | 1-10 | Do. |
| p-Nitro-o-methoxyaniline | 1-10 | Do. |
| p-Nitro-o-ethoxyaniline | 1-10 | Do. |
| p-Nitro-o-(Cl,Br)aniline | 1-10 | Rubine. |
| 2,4-dinitroaniline | 1-10 | Red to purple. |
| 2,4-dinitro-6-(Cl,Br)aniline | 1-10 | Wine to deep violet. |
| 2,4-dinitro-α-naphthylamine | 1-10 | Do. |
| p-Nitroaniline-o-sulfonic acid | 1-10 | Red to rubine. |
| p-Aminoacetanilide | 1-10 | Yellow. |
| o-Aminobenzamide | 1-10 | Do. |
| p-Nitro-o-hydroxyaniline | 1-10 | Red to rubine. |
| 6-methoxy-2-aminobenzothiazole | 1-10 | Red to red violet. |
| Aniline | (11) Tetrahydrofurfurylethylaniline | Yellow. |
| Do | (12) Tetrahydrofurfuryl-β-hydroxy-ethyl-m-toluidine | Do. |
| Do | (13) Tetrahydrofurfuryl-β-hydroxy-propyl-m-(Cl,Br)aniline. | Do. |
| Do | (14) Tetrahydrofurfuryl-γ-hydroxy-propyl-m-(Cl,Br)aniline. | Do. |
| Do | (15) Tetrahydrofurfurylglyceryl-m-methoxyaniline | Do. |
| Do | (16) Tetrahydrofurfurylglyceryl-m-ethoxyaniline | Do. |
| Do | (17) Tetrahydrofurfuryl-β-hydroxy-ethylcresidine | Do. |
| Do | (18) Tetrahydrofurfuryl-β-hydroxy-ethyl-2,5-dimethylaniline. | Do. |
| Do | (19) Tetrahydrofurfuryl-β-hydroyx-ethyl-2,5-diethylaniline. | Do. |
| Do | (20) Tetrahydrofurfuryl-γ-hydroxy-propyl-2,5-dimethoxy-aniline. | Do. |
| o,m,p-(Cl,F,Br,I)aniline | 11-20 | Do. |
| 2,4-dichloroaniline | 11-20 | Orange yellow. |
| 2,5-dichloroaniline | 11-20 | Do. |
| 2-methoxy-5-chloroaniline | 11-20 | Do. |
| 2-methyl-4-(Cl,Br)aniline | 11-20 | Yellow. |
| 4-methyl-2(Cl,Br)aniline | 11-20 | Do. |
| Cresidine | 11-20 | Do. |
| p-Aminoacetophenone | 11-20 | Orange. |
| m-Nitroaniline | 11-20 | Yellow. |
| p-Nitroaniline | 11-20 | Red. |
| o-Nitroaniline | 11-20 | Orange red. |
| p-Nitro-o-methylaniline | 11-20 | Red. |
| p-Nitro-o-ethylaniline | 11-20 | Do. |
| p-Nitro-o-methoxyaniline | 11-20 | Do. |
| p-Nitro-o-ethoxyaniline | 11-20 | Do. |
| p-Nitro-o-(Cl, Br)aniline | 11-20 | Rubine. |
| 2,4-dinitroaniline | 11-20 | Red to purple. |
| 2,4-dinitro-6-(Cl, Br)aniline | 11-20 | Wine to deep violet. |
| 2,4-dinitro-α-naphthylamine | 11-20 | Do. |
| p-Nitroaniline-o-sulfonic acid | 11-20 | Red to rubine. |
| p-Aminoacetanilide | 11-20 | Yellow. |
| o-Aminobenzamide | 11-20 | Do. |
| p-Nitro-o-hydroxyaniline | 11-20 | Red to rubine. |
| 6-methoxy-2-aminobenzothiazole | 11-20 | Red to red violet. |

The coupling components employed in the preparation of the azo dye compounds of our invention may be prepared by any suitable method. Many of the coupling components employed herein may be prepared, for example, by reacting tetrahydrofurfuryl alcohol and β-tetrahydrofurylethanol or γ-tetrahydrofurylpropanol with the desired aromatic amine of the benzene or naphthalene series in the presence of a dehydrating catalyst such as Raney nickel and aluminum oxide. In another way of preparing coupling components used in the preparation of the compounds of our invention, furfuryl or tetrahydrofurfuryl, for example, may be reacted with the desired aromatic amine of the benzene or naphthylamine series and the resulting compound hydrogenated employing a catalyst such as copper chromite. By the first of these methods, tetrahydrofurfurylaniline may be prepared by reacting aniline and tetrahydrofurfuryl alcohol. Similarly, tetrahydrofurfuryl-m-toluidine may be prepared by reacting m-toluidine and tetrahydrofurfuryl alcohol. As a further illustration, tetrahydrofurfuryl-α-naphthylamine may be prepared by reacting α-naphthylamine and tetrahydrofurfuryl alcohol. These and other amines may be reacted with β-tetrahydrofurylethanol and γ-tetrahydrofurylpropanol, for example, to give compounds corresponding generally with those obtained when tetrahydrofurfuryl alcohol is employed. The method in question will be illustrated by reference to the preparation of tetrahydrofurfuryl-m-toluidine.

PREPARATION OF TETRAHYDROFURFURYL-M-TOLUIDINE 106 grams of m-toluidine, 10 grams of finely divided Raney nickel and 100 grams of tetrahydrofurfuryl alcohol are heated at 200–300° C. in a shaking autoclave for 40 hours. The reaction vessel is then cooled and the reaction mixture removed and filtered to remove the nickel catalyst. The brown colored reaction product resulting from the filtration operation is then fractionally distilled and there is obtained a good yield of tetrahydrofurfuryl-m-toluidine (B. P. 152–158° C./8 mm.) and some ditetrahydrofurfuryl-m-toluidine (B. P. 195–205° C./9 mm.).

In order that the application of the compounds of our invention may be understood, their application for the direct dyeing or coloration of materials made of or containing an organic derivative of cellulose and more particularly cellulose acetate silk is described herein.

In employing the azo dye compounds of our invention, they will ordinarily be applied to the material in the form of an aqueous suspension which can be prepared by grinding the dye to a paste in the presence of a sulfonated oil, soap or other suitable dispersing agent and dispersing the resulting paste in water. Dyeing operations, can, with advantage, be conducted at a temperature of 80–85° C., but any suitable temperature may be used. In accordance with the usual dyeing practice, the material to be dyed will ordinarily be added to the aqueous dye bath at a temperature lower than that at which the main portion of the dyeing is to be effected, a temperature approximating 45–55° C., for example, following which the temperature of the dye bath will be raised to that selected for carrying out the dyeing operation. The temperature at which the dyeing is conducted will vary somewhat, depending for example on the particular material or materials undergoing coloration.

The amount of dispersing agent employed may be varied over wide limits. Amounts approximating 10 to 200% by weight on the dye may be employed, for example. These amounts are not to be taken as limits as greater or lesser amounts can be used. To illustrate, if the dye is ground to a sufficiently fine powder, dyeing can be satisfactorily carried out without the aid of a dispersing agent. Generally speaking, however, the use of a dispersing agent is desirable.

Advantageously, dyeing is carried out in a substantially neutral dyebath. Perhaps, more accurately, it should be stated that dyeing should not be carried out in an alkaline dyebath, that is, one having any substantial alkalinity, since the presence of free alkali appears to affect the dyeing adversely. Dyeing in an acid dyebath is not recommended because of the tendency of acids to affect the material undergoing dyeing adversely. Because of these considerations, when a dispersing agent is to be employed, preferably it is neutral or substantially neutral.

It will be understood that the azo dye compounds of our invention may be applied to the material to be colored in any suitable manner. Coloration may be effected, for example, by dyeing, printing or stenciling. Dispersing or solubilizing agents that can be employed for preparing suspensions of the dye include soap, sulphoricinoleic acid, salts of sulphoricinoleic acid, a water-soluble salt of cellulose phthalate, cellulose succinate or cellulose monoacetate diphthalate, for example, the sodium, potassium or ammonium salts, and sulfonated oleic, stearic or palmitic acid, or salts thereof, such, for example, as the sodium or ammonium salts.

While it is preferred to effect dyeing by applying the dye compound from an aqueous dyebath directly to the material to be dyed, dyeing may be effected, for example, by absorbing and diazotizing an amine on the fiber after which the dye is formed in situ by coupling with a coupling component such as tetrahydrofurfuryl-m-toluidine or tetrahydrofurfurylethylaniline, for example.

The following example illustrates how dyeing may be carried out in accordance with our invention. Quantities are expressed in parts by weight.

*Example A*

2.5 parts of

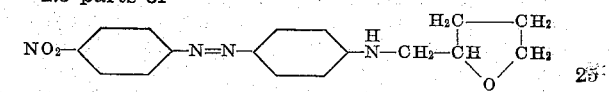

are finely ground with a dispersing agent such as soap or oleyl glyceryl sulfate and the resulting paste is dispersed in 1000 parts of water. The dispersion thus prepared is heated to a temperature approximating 45–55° C. and 100 parts of cellulose acetate silk, in the form of yarn or fabric, for example, are added to the dyebath after which the temperature is gradually raised to 80–85° C. and the silk worked for several hours at this latter temperature. Sodium chloride may be added as desired during the dyeing operation to promote exhaustion of the dyebath. Upon completion of the dyeing operation, the cellulose acetate silk is removed, washed with soap, rinsed and dried. The cellulose acetate silk is colored a red shade of good fastness to light.

While our invention has been illustrated in connection with the dyeing of cellulose acetate silk, it will be understood that dyeing operations can be carried out in a manner similar to that described above by the substitution of another organic derivative of cellulose material for cellulose acetate silk, or by employing dye compounds other than those employed in the example, or by substitution of both the material being dyed and the dye compounds of the examples.

Certain of the azo dye compounds of our invention such as those containing a sulfonic acid group in the form of an alkali metal salt are water soluble and these compounds may be dissolved directly in the dyebath and employed to dye material undergoing dyeing without employing a dispersing agent.

This application is a continuation in part of our application Serial No. 78,170, filed May 6, 1936, now United States Letters Patent No. 2,107,898, issued February 8, 1938.

We claim:

1. Azo dye compounds having the general formula:

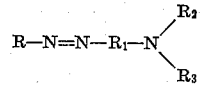

wherein R represents an aromatic nucleus, $R_1$ represents a member selected from the group consisting of a benzene and a naphthalene nucleus, $R_2$ represents a member selected from the group consisting of hydrogen, an alkyl group, a cyclohexyl group, a phenyl nucleus, a tetrahydrofuryl group and a tetrahydrofuryl group joined to the hydrogen atom through a straight chain hydrocarbon linkage and $R_3$ represents a member selected from the group consisting of a tetrahydrofuryl group and a tetrahydrofuryl group joined to the nitrogen atom through a straight chain hydrocarbon linkage.

2. Azo dye compounds having the general formula:

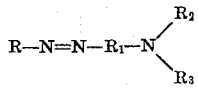

wherein R represents an aromatic nucleus, $R_1$ represents a benzene nucleus, $R_2$ represents a member selected from the group consisting of hydrogen, an alkyl group, a cyclohexyl group, a phenyl nucleus, a tetrahydrofuryl group and a tetrahydrofuryl group joined to the nitrogen atom through a straight chain hydrocarbon linkage and $R_3$ represents a member selected from the group consisting of a tetrahydrofuryl group and a tetrahydrofuryl group joined to the nitrogen atom through a straight chain hydrocarbon linkage.

3. Azo dye compounds having the general formula:

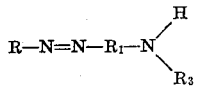

wherein R represents an aromatic nucleus, $R_1$ represents a member selected from the group consisting of a benzene and a naphthalene nucleus and $R_3$ represents a member selected from the group consisting of a tetrahydrofuryl group and a tetrahydrofuryl group joined to the nitrogen atom through a straight chain hydrocarbon linkage.

4. Azo dye compounds having the general formula:

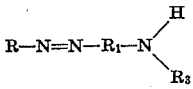

wherein R represents an aryl nucleus of the benzene series, $R_1$ represents a member selected from the group consisting of a benzene and a naphthalene nucleus and $R_3$ represents a tetrahydrofuryl group.

5. Azo dye compounds having the general formula:

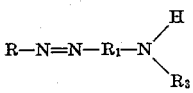

wherein R represents an aryl nucleus of the benzene series, $R_1$ represents a member selected from the group consisting of a benzene and a naphthalene nucleus and $R_3$ represents a tetrahydrofuryl group joined to the nitrogen atom through a straight chain hydrocarbon linkage.

6. Azo dye compounds having the general formula:

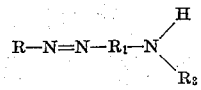

wherein R represents an aryl nucleus of the benzene series, $R_1$ represents a member selected from the group consisting of a benzene and a naphthalene nucleus and $R_3$ represents a tetrahydrofuryl group joined to the nitrogen atom through a straight chain hydrocarbon linkage containing not more than four carbon atoms.

7. Azo dye compounds having the general formula:

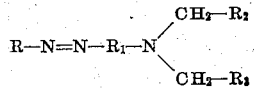

wherein R represents an aromatic nucleus, $R_1$ represents a member selected from the group consisting of a benzene and a naphthalene nucleus and $R_2$ and $R_3$ each represents a tetrahydrofuryl nucleus.

8. Azo dye compounds having the general formula:

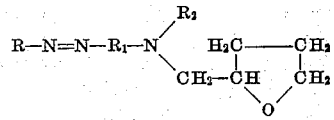

wherein R represents an aryl nucleus of the benzene series, $R_1$ represents a member selected from the group consisting of a benzene and a naphthalene nucleus and $R_2$ represents a member selected from the group consisting of hydrogen and tetrahydrofurfuryl.

9. The process of preparing azo dye compounds which comprises diazotizing an aromatic amine and coupling the diazonium compound formed with a coupling component having the general formula:

wherein R represents an aromatic nucleus, $R_1$ represents a member selected from the group consisting of a benzene and a naphthalene nucleus, $R_2$ represents a member selected from the group consisting of hydrogen, an alkyl group, a cyclohexyl group, a phenyl nucleus, a tetrahydrofuryl group and a tetrahydrofuryl group joined to the nitrogen atom through a straight chain hydrocarbon linkage and $R_3$ represents a member selected from the group consisting of a tetrahydrofuryl group and a tetrahydrofuryl group joined to the nitrogen atom through a straight chain hydrocarbon linkage.

JOSEPH B. DICKEY.
JAMES G. McNALLY.